United States Patent
Uchiyama

[15] 3,643,564
[45] Feb. 22, 1972

[54] INDICATOR FOR FLASHLIGHT PHOTOGRAPHY

[72] Inventor: Takashi Uchiyama, Tokyo, Japan
[73] Assignee: Canon Inc., Tokyo, Japan
[22] Filed: Oct. 21, 1969
[21] Appl. No.: 868,085

[30] Foreign Application Priority Data

Oct. 28, 1968 Japan.....................................43/78462
Dec. 6, 1968 Japan.................................43/106459

[52] U.S. Cl..............................95/10 C, 95/64 A, 356/227
[51] Int. Cl.......................G01j 1/44, G03b 7/02, G03b 7/16
[58] Field of Search.................95/10 C, 11 R, 11.5 R, 64 R, 95/64 A; 356/218, 227

[56] References Cited

UNITED STATES PATENTS

| | | | |
|---|---|---|---|
| 2,730,885 | 1/1956 | Kaprelian | 95/11.5 UX |
| 3,212,418 | 10/1965 | Kuppenbender et al. | 95/10 C |
| 3,344,724 | 10/1967 | Taguchi | 95/10 C |
| 3,374,718 | 3/1968 | Hochreiter | 95/10 C |
| 3,406,619 | 10/1968 | Rentschler | 95/10 C |
| 3,498,192 | 3/1970 | Ito et al. | 95/10 C |
| 3,527,149 | 9/1970 | Starp | 95/10 C |

Primary Examiner—Joseph F. Peters, Jr.
Attorney—McGlew and Toren

[57] ABSTRACT

An indicator for flashlight photographing is provided with an exposure-measuring circuit Y comprising at least an ammeter 1 and a photosensitive current source P. "A flash-ready" range F is provided outside of an EE operation range A of a pointer 1—1 of said ampere meter 1, an overrange 0 and an under range U. As the exposure is adjusted the pointer 1—1 is brought in the flash-ready range F to indicate that the preparation for flash photography is completed.

25 Claims, 19 Drawing Figures

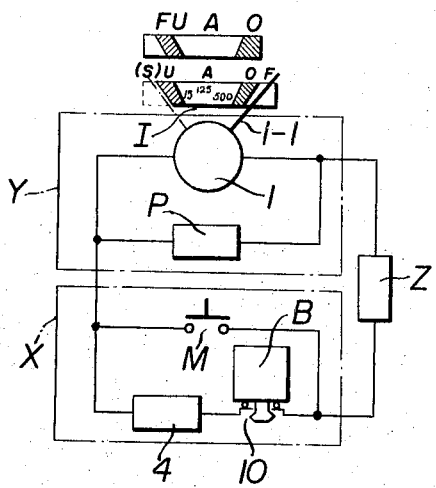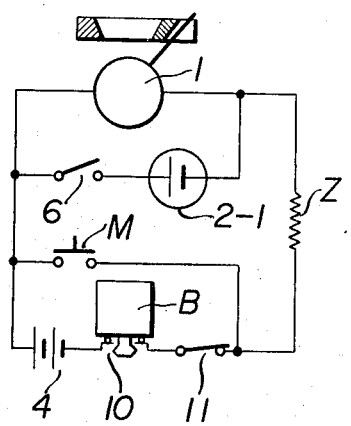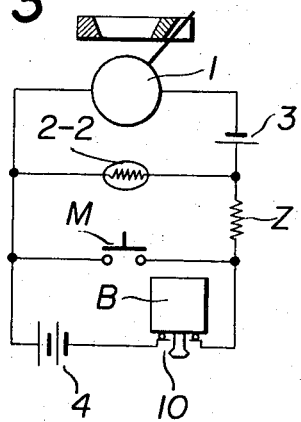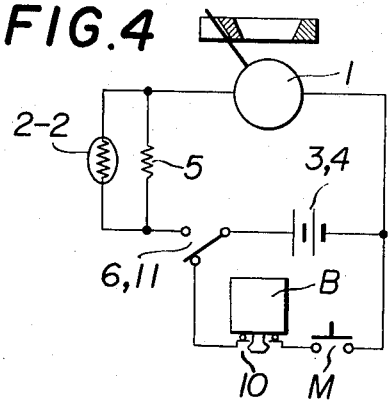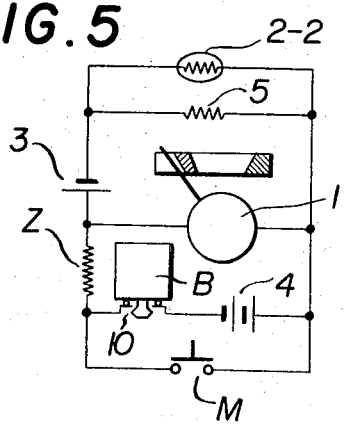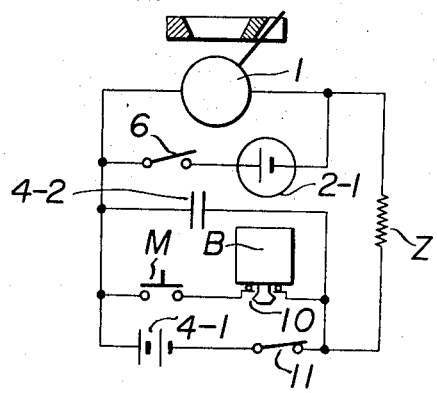

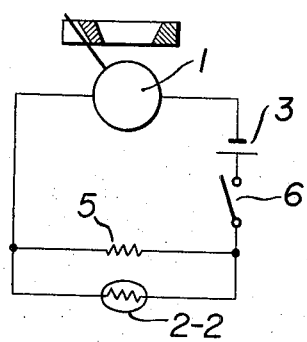
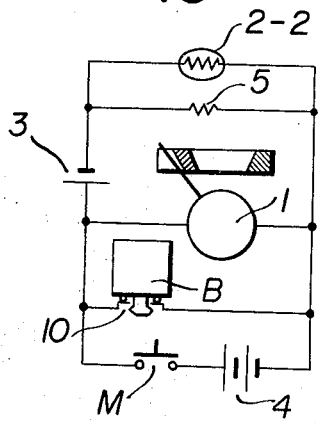
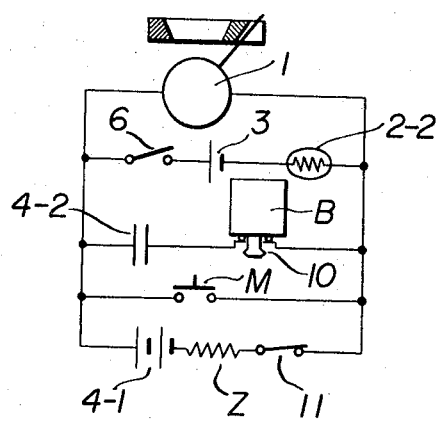
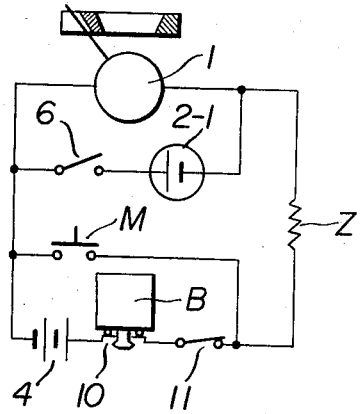
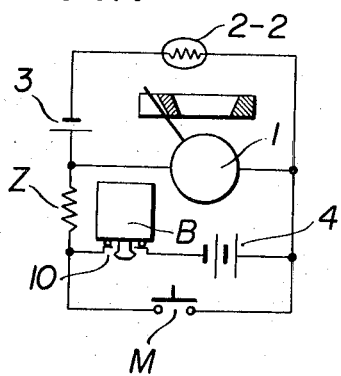
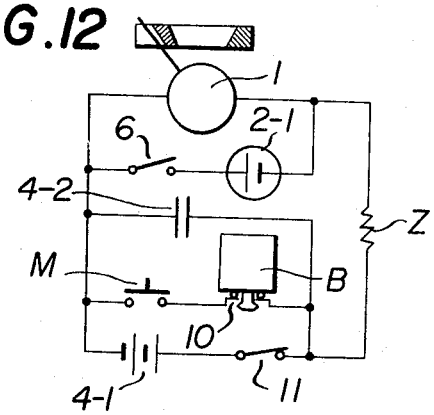

FIG.15-a 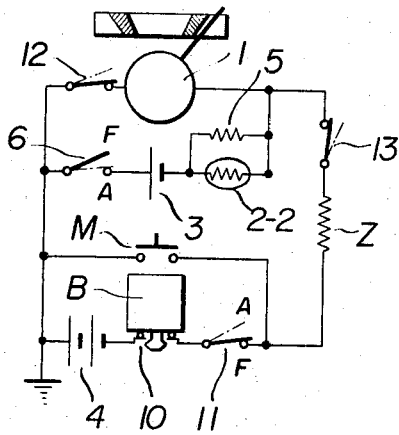
FIG.15-b 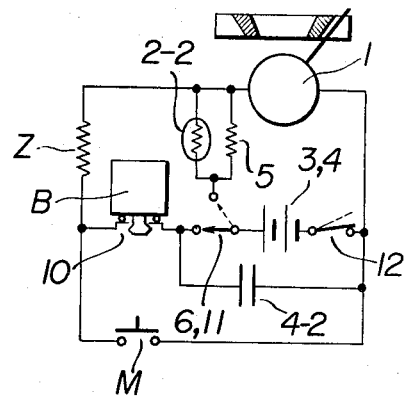
INVENTOR.
TAKASHI UCHIYAMA

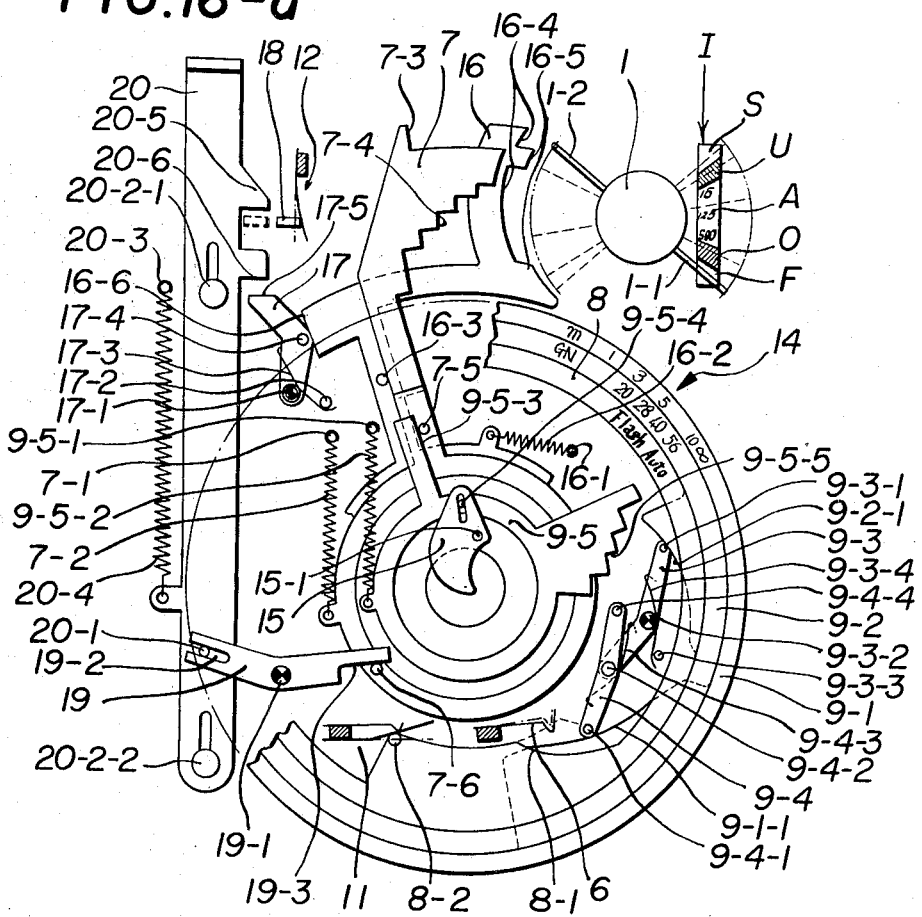
FIG.16-a
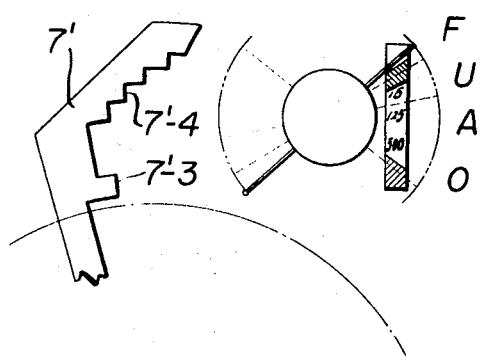
FIG.16-b
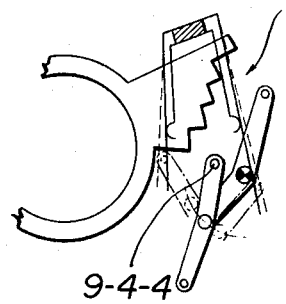
FIG.16-c

INDICATOR FOR FLASHLIGHT PHOTOGRAPHY

BACKGROUND OF THE INVENTION

This invention relates to an indicator for indicating a camera's preparation for flash photography and, particularly to a device for indicating a flash-ready condition making use of an ammeter of a camera with an exposure meter built therein. When a photograph is taken with a flash, the object of the indicator may be simply and accurately attained by shifting a pointer of the ampere meter beyond its moving range. Namely, when the deflection of the pointer of ampere meter indicated within a finder is merely glanced, it may be confirmed whether the readiness for auto-photographing or flashlight photographing is properly made or not.

Conventionally these kinds of cameras are often provided with an indicator for insufficient exposure having a mark "↳" and the like at a given portion near "zero" of the indication plate of an ammeter. When the quantity of light from an object to be snapped is feeble and the pointer shifts beyond the moving range of ammeter, namely, when the shift of the pointer of an ampere meter reaches to the given portion, the shutter speed is changed down to a speed for flashlight photographing. This is done by means of a changeover ring for "auto," "manual," "flash" etc. This permits accurate flash photography.

When such conventional systems are used in dark light where flashlight illumination is required for photography, the shift of the pointer of an ampere meter approaches zero, it is impossible to determine whether the shift has reached zero for changing the camera over to flash. This indication of flash-ready range should be provided separately. Even in a simple camera, such as a program-shutter EE camera or an iris-preset EE camera, a manual changeover operation is required. Such a determination cannot be carried out, unless the indication flash-ready is separately provided or the ammeter circuit is cut off at the time of the changeover.

In one known system of a camera, the pointer of the ammeter reaches zero, when the camera becomes flash-ready. One such camera is intending to indicate clearly that the flashlight photography is ready even when some daylight remains and naturally the pointer of ampere meter deflects slightly. However, in this case, it is impossible to discriminate between a deflection indicating zero due to the changeover and one due to the darkness.

In another example, at a suitable position within the moving range (for instance EV8-7) of the pointer of an ampere meter, a point (near EV12) is marked for indicating flash-ready at the time of auto-photography. Thus a small improvement is achieved over the above example. However, even in this example, the indication is not perfect because the point shifts only within the moving range.

In any of the above-mentioned examples, the determination of the flash-ready condition is difficult because the position of a pointer of the ammeter at the time of flash-ready condition exists within the moving range (including overrange and underrange) of the pointer at the time of auto-flashing.

For the same reason, in low cost cameras, such as a program-shutter EE camera or an iris-preset EE camera, it is not desirable to set a proper shutter speed for flashlight photography. This is because special changeover mechanisms are required therefor.

A conventional device for indicating the condition of flash-ready includes a small lamp. However, such a device is not advantageous because of necessity of such a lamp and a mechanism for changing shutter speed.

SUMMARY OF THE INVENTION

According to a feature of the present invention, the flash-ready condition is determined by making the moving range of the pointer at the time of auto-photography and the position of pointer at the time of flash-ready are entirely different from each other. Thus no special mechanism is required to change over the shutter speed for flashlight photography. The camera is constructed so that the indication of the condition is automatically changed merely by inserting a flash bulb and the shutter speed also is changed for flash photographing. It is also possible to take an ordinary photograph without flashing the inserted bulb. When the flash circuit is a BC type, the condition of preparation for charging the capacitor, is also applied.

BRIEF DESCRIPTION OF THE DRAWINGS

The present invention will be explained by referring to the attached drawings, in which:

FIG. 1 to FIG. 15 are circuit diagrams of indicators for indicating the condition of flash-ready of a camera.

FIG. 1 is a fundamental circuit diagram and FIG. 15-a and -b are an example which enables a pointer to indicate the condition ready for photographing.

FIG. 16-a is a schematic drawing of a mechanism corresponding to the example shown in FIG. 15-a, and FIG. 16-b and -c show modifications of parts of the example shown in FIG. 16-a.

DETAILED DESCRIPTION OF PREFERRED EMBODIMENTS

Figure 13:
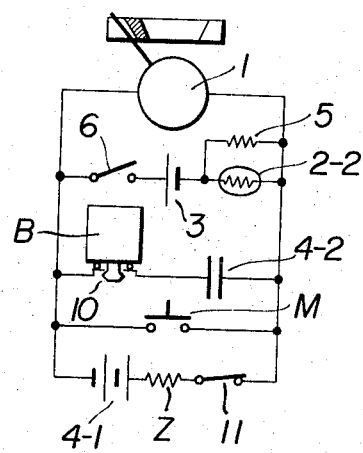

In FIG. 1 to FIG. 16 inclusive, 1 denotes an ampere meter current meter, or ammeters, 1–1 a pointer, 2 a photoelectric transducer, 2-1 a photocell, 2–2 a photoconductor, 3 a driving source for the ammeter, 4 a power source for flash circuit, 4-1 a battery, 4-2 a condenser, 5 a bypass resistor, 6 a switch in the ampere meter circuit, 7 a detecting member for shutter speed, 8 a member for setting and indicating flash or auto and 9 a flash-auto mechanism.

The character A denotes a range of EE operation of an indicating plate I arranged, for instance, in a finder, O and U denotes ranges outside of the range of EE operation, and O denotes a range of too bright and U a range of too dark.

In case of U, it is better to use flash illumination. When the operation therefor is performed, the pointer will enter a range F. This indicate flash-ready. S denotes a nonprepared range, for photographing.

The character B denotes a flash bulb, P a photosensitive power source of a photometric circuit, X a flash circuit, Y an exposure measuring circuit, Z an element, such as a resistor, for assuring the operation of X and Y.

In FIG. 1, the voltage of the photosensitive power source P will vary in proportion to the brightness. This is indicated on the indicating plate I by means of the pointer 1–1 of the meter 1. When the object to be photographed is too bright, the pointer 1–1 enters in the range of O, and when the object is too dark, the pointer enters in the range of U. The meter 1 is influenced by the driving source 4 of the flash circuit X only when the flash lamp B is set, and in this case the pointer 1—1 enters in the range of F of the indicating plate I to show flash-ready. A synchronous contact M becomes "on" interlocking with the shutter-driving mechanism, thus a flash-illuminated photograph is taken. Further, an element of Z, for instance a resister is necessary for connecting the exposure measuring circuit Y with the flash circuit X.

The photosensitive power source P has an upper limit in a so-called "Dynamic Range." The source P is responsive to the brightness of the object to be photographed. It is necessary to select the internal impedance of the source so as not to exceed that in the predetermined range (overrange) in view of the combined action of the internal equivalent impedance of said source and of said meter with the saturation rotation of the meter. Further it is necessary to construct each element so that the meter may rotate beyond the saturation range by using the low internal impedance as that of a power source to the ampere meter.

In FIG. 2, the exposure measuring circuit Y and the flash circuit X are connected by means of the resistor Z and the switches 6 and 11 of both the circuits Y and X are associated. In the case of general auto-photography, the pointer 1—1 of the ampere meter 1 is deflected by the electromotive force generated by a selenium cell 2-1 and the shutter speed is indicated on the indicating plate I in the finder.

In the indicating plate, there are inhibit ranges U and O on both ends to show ranges of under and over exposure respectively. In case of flashlight photography the switch 11 of the flash circuit X is closed and the switch 6 of the exposure-measuring circuit is opened in association with the switch 11.

When a flash bulb B is inserted into a socket 10, the electric current flows from the battery 4 through the resistor Z and the pointer 1—1 of the meter will deflect up to the range of flash-ready F on the right end of the indicating plate I. Under this condition, the shutter button of the camera is pushed, then the synchronous contact M is closed to ignite the flash bulb B. Further, if the associating mechanism of the switches 6 and 11 is interlocked with that of a distance-setting ring and/or an iris-setting ring of the camera, a proper iris diameter may be automatically set by adjusting the distance.

The indicator according to the present invention may be very easily included in a camera and has a number of effects mentioned as follows.

a. In case of auto-photography, even if the flash bulb is inserted into the socket, the indication shows a proper exposure and the auto-photography, may be achieved.

b. In case the changeover ring of a camera is set to flash the pointer of the meter does not deflect up to the range F, if the flash bulb is not inserted or is disconnected, whereby the bulb may be effectively checked.

c. Even when the resistance value of the resistor Z is properly selected to afford the battery 4 sufficient voltage for flash photography and to make the pointer to deflect up to the range F, the pointer does not deflect up to the range F, if the battery is bad. This allows the battery to be checked.

FIG. 3 shows the lamp B connected in series with the driving source 3 of the meter and the power source 4 of the flash circuit. In this case the meter may be changed over merely by the attachment and detachment of the flash bulb B without using any switch for circuit.

FIG. 4 shows an embodiment of the invention where a power source is used both for the exposure-measuring circuit Y and for the flash circuit X. In this case the camera may be assembled compactly without injuring the predetermined performance.

FIG. 5 shows a circuit diagram for another embodiment of a device according to the present invention. Here the pointer 1—1 of the ampere meter 1 is made to rest near zero when the flash bulb B is inserted in the socket 10. The reverse current from the power source battery 4 of the flash circuit X flows to the exposure-measuring circuit Y through high resistor Z. In this case, it is not necessary to cut off the exposure measuring circuit, and the shutter speed is automatically set to a speed for flash.

FIG. 6 shows a circuit diagram for a device, in which a C-type flash device X and the selenium cell 2-1 are used. The current consumption from the battery is small, because the charge of a condenser 4-2 is performed only when the switches 6 and M are changed over to the condition of flash-ready, and the transient condition for charging the condenser 4-2 is indicated by the pointer 1—1 of the ammeter.

In FIG. 7, the value of the bypass resistor 5 parallel to the photo conductor 2—2 is selected such that the pointer of the ampere meter 1 deflect up to the range U, even though the quantity of incident light is very small. Thus, when the camera is changed to the condition of flash-ready and the switch 6 for the power source is opened, the pointer of the ampere meter 1 will points to zero, namely the flash-ready range F. This confirms that the preparation for flashlight photographing is completed.

In FIG. 8, the ammeter 1 is connected in parallel with far smaller resistance of the bulb B than the internal resistance of the ampere meter 1, so that the deflection of the pointer 1—1 thereof will indicate a value near zero, namely the range F ready for flash. Therefore, in this circuit, any switch for power source of the exposure measuring circuit Y becomes unnecessary.

Further, in this circuit, electric current flows from the battery 4 to the flash bulb through the resistor 5, however, the bulb will never flash in response to this small current.

In FIG. 9, instead of the selenium cell 2-1, a photoconductor 2—2 and a battery 3 are used in the exposure-measuring circuit Y. The socket 10 of the flash bulb B and the condenser 4–2 are connected in series to the battery 4, so that when the bulb B is disconnected, the current consumption of the battery 4 is small, even though the switch 11 is left in its closed condition. The condenser 4-2 is charged through high resistance Z, so that no further charging to this condenser takes place until the film is advanced after completion of one snap and an unused bulb is set at the position for the next photograph. The ready condition for taking photographs may be confirmed, by making the pointer 1—1 of the meter read below the range F during the charging, but to deflect into the range F as soon as the charging is completed.

In FIG. 10, the power source for flash circuit as shown in FIG. 2 is connected so as to oppose the current from the source 2-1.

In FIG. 11, the bypass resistor in FIG. 5 is removed. The indication becomes U at about the current zero, and in case of flash-ready, the pointer of the ampere meter comes under zero and deflects to negative side.

In FIG. 12, the power source in FIG. 6 is connected with a different polarity.

In FIG. 13, the power source in FIG. 9 is connected with a different polarity and the photovoltaic cell is connected with the bypass resistor.

Figure 14:
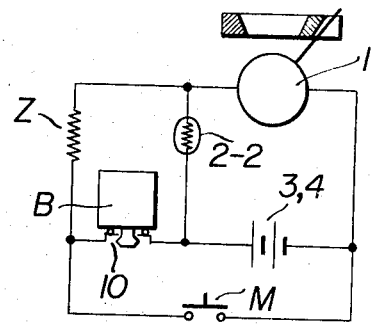

In FIG. 14, the indicator is so constructed that the power source is used for both the meter and the bulb and the pointer is made to deflect beyond the overrange 0 when the flash is ready for photographing.

In FIG. 15-a, the main portions of the above-mentioned respective circuits are combined to indicate the completion of preparation for flash photograph condition as well as to indicate the time when the flash-auto mechanism falls outside of interlocking range due to the G.N. (guide number), the distance to the object to be photographed and the like, to indicate when the windup of film (if circumstances require, the rotation for flash cube is simultaneously achieved) is not finished and to indicate the mechanism for cutting off the main switch when the camera is not used. In the circuit diagram of FIG. 15-a, 12 is a switch, which becomes on when the winding up of film is completed or a switch which becomes off when the camera is not used, or may be a switch which has both of these functions. Character 13 is a switch interlocking with the flash-auto mechanism and turns off when the mechanism falls outside of interlocking range, to cut off the connection with the power source 4 for flash circuit and to deflect the pointer 1—1 to zero, and thus to indicate the range S where the preparation of photographing is not yet completed. The switch 13 may be brought to on or off in case of auto. Now, when the switch 12 for completion of winding up (or main switch 12) turns off, the pointer 1—1 indicates S, because no electric current flows in the ammeter 1. This indicates that the photographic operation is not yet completed. Further, in this case, since the switches 6 and 11 are associated as mentioned above, the circuit in which electric current flows from the power source 3 or 4 is merely the circuit passing through a synchronous contact M. If the shutter button is so constructed that it can not be pushed down when the pointer 1—1 is existing in S, M will never close, so that the power source will not be consumed.

When the switch 12 is on, the switch 6 off and the switch 11 on, namely flash-ready, the pointer 1—1 will indicate F only after the bulb B is inserted. In case the changeover ring of the camera is set to flash, the pointer does not deflect to F and remains in S when the bulb B is not inserted, or when the inserted bulb is already used or disconnected. Further, when the switch 13 of the flash-auto mechanism turns off because the mechanism is outside of interlocking range, the pointer will also remain in S.

The pointer 1—1 of the ampere meter 1 does not enter into F when the voltage of the power source 4 for the flash circuit is lower than the predetermined voltage for flashing the bulb. Thus the voltage of the power source 4 may be checked in this manner.

Next, when the switch 12 is brought to on, the switch 6 to on and the switch 11 to off, namely to auto, even though the bulb B is inserted, the bulb never flashes even when the synchronous contact M is closed, as mentioned above, and the pointer 1—1 will indicate any of U, A, or O, namely any of the cases "take photograph with flash light because it is too dark," "auto-photographing is possible," or "impossible to photograph because it is too bright." When the camera is set completely to auto and it is too dark, the pointer 1—1 resides in U and does not enter into S, as mentioned above.

As is clear from the above explanation, when the operation is possible, the pointer 1—1 always rests at A or F. When the operation is impossible, it points to S, U or O. This is very convenient for users, and more convenient, if the opening and closing of the switches and the like are associated with the mechanism.

The above explanation concerns mainly FIG. 15-a. The explanation applies to the circuit of FIG. 15-b, which uses a single power source, and a condenser is also used.

FIG. 16 shows schematically a mechanism, allowing indication of readiness for taking a photograph by use of the above-mentioned circuit.

FIG. 16-a shows a relation of each member of the mechanism set to flash embodying for instance, the circuit of FIG. 15-a.

In FIG. 16-b, there is described only a modified portion, wherein the flash-ready range F is arranged on the side of underrange U. And, in FIG. 16-c, a portion of flash-auto mechanism is picked up to show the relation thereof with the switch 13.

IN FIG. 16-a, the pointer 1-1 of the ampere meter 1 indicates F range of the indicating plate I corresponding to the conditions ready for flash of the camera. A stop pin 1-2 rotates with the pointer 1-1 integrally. A detecting member 7 indicating the shutter speed is biased in the clockwise direction by means of the spring 7-2, one end of which is fitted to the fixed pin 7-1. Upon a release operation, the stop pin 1-2 will knock against the cam portion 7-3. A predetermined speed for flash photography is obtained. Thereafter when the pointer 1-1 indicates A, a speed corresponding to the brightness of the object to be photographed is obtained. When the mark auto is set to a fixed index 14, the member 8 for setting flash-auto bonds the switch 6 into the exposure-measuring circuit with the slant face 8-1 and grounds the switch 6, which is insulated. It turns this switch on. At the same time, it rotates a pin 9-4-1 and renders the flash-auto mechanism 9 inactive. The insulating pin 8-2 attached to the member 8 turns the switch 11 in the flash circuit on when the camera is set to flash and turns said switch 11 off when it is set to auto.

In the flash-auto mechanism shown, a distance-adjusting ring 9-1 is set to 5 m. In its adjusted position, the ring 9-1 shifts the pin 9-4-1 with a cam face 9-1-1. Character 9-2 is a GN ring and is set to GN 28 in the drawing. A cam face 9-2-1 of said ring 9-2, shifts a pin 9-3-1 according to its set position.

Levers 9-3 and 9-4 add distance and GN. The lever 9-3 rotates around the center of a fixed shaft 9-3-2. Its amount of rotation is determined by the GN, because the pin 9-3-1 is pushed onto the cam face 9-2-1 by a spring 9-3-4 biased by a fixed pin 9-3-3. On the other end of the lever 9-3 a lever 9-4 is attached to rotate around a pin 9-4-2. Since the pin 9-4-1 is pushed on to the distance-adjusting cam 9-1-1 by means of a spring 9-4-3, the position of a pin 9-4-4, acting as a stopper for the iris-setting ring 9-5, is finally determined by the distance and the GN. The iris-setting ring 9-5 is given a rotating force in the clockwise direction by means of a spring 9-5-2, biased by a fixed pin 9-5-1 and upon a releasing operation, when the member 7 rotates, the pin 7-5 and a projection 9-5-3 are rotated together as the pin 7-5 is pushed in engagement with the projection 9-5-3, when using auto, the cam face 7-4 is stopped by the stop pin 1-2 which rotates integrally with the pointer 1-1 of the ammeter, so thus an amount of rotation corresponding to the brightness of the object to be photographed is obtained. The predetermined speed, for instance, 1/30 sec. is obtained and at the same time, the predetermined iris diameter may be obtained. As shown in the drawing, the aperture of iris is determined by the amount of rotation of the iris blades 15 around the fixed shaft 15-1 caused by a pin 9-5-4 as a center of its rotation. In this case, since the pin 9-5-4 is rotated in the clockwise direction by means of the slant face 8-1, the rotation of 9-5 will never be hindered. In general, a plurality of blades are used as the iris blades 15; however, in the drawing, merely one blade is shown. In case of flash, the member 7 rotates until the cam portion 7-3 strikes the stop pin 1-2, but since any of cam portion 9-5-5 of the iris-setting ring 9-5 will strike against the pin 9-4-4 shifted according to the distance and GN before said cam portion 7-3 strikes on said stop pin 1-2, a proper iris diameter for flashlight photographing as well as a predetermined shutter speed therefor is obtained. It is understood that the shape of each cam surface, the dimension of lever and the like must be suitably determined in the above-mentioned flash-auto mechanism. Character 16 denotes a member for clamping the stop pin 1-2 which is biased in the clockwise direction by the spring 16-2 held by the fixed pin 16-1. Upon release, the member 7 is turned in the clockwise direction, while the pin 16-3 pushes onto the member 7, until the clamp face 16-4 or 16-5 strikes on the stop pin 1-2 to clamp this pointer as well as to detect the deflection angle of the ampere meter 1. Character 17 denotes a lock lever to prevent a release operation in case of a small deflection angle of clamping member 16. The member 16 is biased in the clockwise direction around the center of fixed shaft 17-1 in such a that the pin 17-4 pushes against the projection 16-6 of the member 16 by the spring 17-3 biased by means of the fixed pin 17-2. Character 18 denotes a member, which controls the releasing action and at the same time controls the switch 12. After the film in a camera is advanced or in case the camera is ready for use the member 18 sets the switch 12 to on. On the other hand the member 18 sets the switch 12 to off before the film in the camera is advanced or in case the camera is put into an unused condition. Character 19 denotes a connection member which rotates around the center of the fixed shaft 19-1, and is connected at a forked portion 19-2 with a release lever 20 through its pin 20-1, while the other end 19-3 of said lever 19 is pushed onto the pin 7-6 of the detecting member 7 of the shutter speed. The release lever 20 is supported by fixed pins 20-2-1 and 20-2-2 movably in vertical direction, it is constructed so that a strong spring 20-4, one end of which one end is supported by a fixed pin 20-3, can reset all members in the mechanism may be reset to their original position against the springs 7-2, 9-5-2, 16-2, 17-3 and the like, after the release operation is completed.

Next, the movement of each member during release operation will be explained.

First, in case the winding up of a film is not yet finished or the camera is set to unused condition, the switch 12 is off and the pointer 1-1 indicates S, as is explained about FIG. 15-a, and at the same time the member 18 strikes against the projection 20-5 of the release lever 20 as shown by the dotted line, so that the release operation is not possible.

When the windup of a film is finished and the member 18 is out of the way of the lever 20 (shown by full line), if the release lever 20 is slightly lowered, the member 16 is rotated through the members 19 and 7. Its amount of rotation is determined by the deflection angle of the ammeter 1, namely when the pointer 1-1 indicates F or A, the member 16 rotates sufficiently until the cam face 16-4, strikes against the stop pin 1-2, and the lock lever 17 rotates sufficiently to give sufficient space for the passage of the projection 20-6 of the release lever 20, so that operation becomes possible.

When the pointer 1-1 indicates S, U or O, the operation is impossible. Even if the release lever is pushed down by error, the lock lever 17 cannot rotate sufficiently, because the cam face 16-5 strikes against the stop pin 1-2, and the projection 20-6 strikes against the portion 17-5. Pushing down is no more possible.

As is clear from the above explanation, the release lever 20 may be pushed down only when the changeover ring 8 is set to auto and the pointer 1-1 indicates A, or when the ring 8 is set to flash and the pointer 1-1 indicates F. With flash photography, the iris aperture for proper exposure is determined by GN and distance. However, there is a maximum iris aperture and minimum iris aperture in each camera. Thus the possible range for photography becomes limited. As is clear from the above explanation, the position of the pin 9-4-4 shows the setting of the iris aperture. When the switch 13 exceeds the maximum iris aperture or the minimum iris aperture, if the switch 13 in the camera as shown in FIG. 16 c is constructed so as to be turned off by the insulated pin 9-4-4 when it moves out of its moving range. Since the pointer 1-1 does not enter into the range F, nor in the range S, it is found that the shutter release is impossible. Thus careless release of the shutter may be prevented. When the flash photography occurs and the release lever 20 is restored, the member 16 releases the stop pin 1-2, and the member 18, which is pushed by the slant face of the projection 20-5 gets over this projection and enters in a position shown by the dotted line to turn the switch 12 off. Thus the connection between the power source 4 and the ammeter 1 is cut off. The pointer 1-1 enters S and does not deflect until the preparation for shutter release is completed again.

FIG. 16-b shows the shape of ring for setting the shutter speed in case the value of electric current for flash-ready is smaller than the value thereof when U is indicated.

As is clear from the above explanation, if the mechanism of camera is constructed as shown in FIG. 16 and the changeover operation of the switch and the like are mutually associated, a very convenient camera system may be obtained when the circuit diagram of FIG. 15-a is used. In this example, it is possible to unite the GN setting ring 9-2 and the changeover ring 8. The scope of this invention should not be limited to the construction shown in the drawing. And, it is also possible to construct the mechanism incorporating any of the above-mentioned circuits and the circuit, when any itself shall not be limited to those shown in the drawings.

In the above examples FIG. 1 to FIG. 16 inclusive of the present invention, it is possible to set the sensitivity of film by connecting a variable resistance responsive to the sensitivity of film, in parallel to the meter 1, or by providing iris blades, which will control the quantity of received light, in front of the photoconductor 2-2.

In further modifications of circuit arrangement a large amount of electric current may flow in the meter 1 upon releasing, namely when the synchronous contact M is closed. However, in ordinary cameras the pointer does not deflect, it is so constructed that suddenly since such a member as the lamp plate 16 is provided and the flow of such large current as to damage the ampere meter 1 can be prevented.

Concerning FIG. 16 an explanation has been made on the opening and closing of each switch which is interlocked with the mechanism portion shown in FIG. 16, but it may be interlocked with the attachment and detachment of the bulb B.

In each circuit diagram, there are described only those members which are dispensable for respective circuits. However, in case of practical manufacturing, some resistors and the like for compensation are added.

What is claimed is:

1. An indicator system for a camera, comprising photosensitive means responsive to the light on an object meter means coupled to said photosensitive means for indicating over a given range the light to which such photosensitive means is subject, source means, connection means connectable to a flash unit, switch means connecting said connection means to said source means for operating said flash unit when said flash unit is connected to said connection means, and circuit means for coupling said connection means and said source means into said meter means for establishing a reading outside the given range when said connection means is connected to the flash unit.

2. An indicator as in claim 1 wherein said connection means connects to a flash unit composed of a flashbulb whereby the flashbulb changes the impedance of said connection means.

3. An indicator as in claim 1, wherein said photosensitive means includes a photoelectric transducer.

4. An indicator as in claim 3, wherein said photoelectric transducer includes a photovoltaic cell.

5. An indicator as in claim 3, wherein said photoelectric transducer includes a photoconductor and wherein said photosensitive means includes electrical energizer means for energizing said photoconductor.

6. An indicator as in claim 1, wherein the given range includes an underrange and an overrange.

7. An indicator as in claim 1, wherein said photosensitive means includes a photoconductor, and wherein said circuit means includes electrical means for connecting said photoconductor to said source means.

8. An indicator as in claim 4, wherein said circuit means connects said source means to said meter means only when said connection means is connected to the flash unit.

9. An indicator as in claim 1, wherein said switch means includes capacitor means connected parallel to said connection means.

10. An indicator as in claim 1, wherein said circuit means connects said source means to said meter means such as to reinforce the effect of said photosensitive means.

11. An indicator as in claim 1, wherein said circuit means connects said source means to said meter means when said connection means is connected to the flash unit so as to buck the effect of said photosensitive means.

12. An indicator as in claim 1, wherein said circuit means includes a switch for indicating a flash-ready condition, said switch being connected in said circuit means so as to energize said meter means with said source means in response to said connection means only when the switch indicates a flash-ready condition so as to otherwise indicate a non-flash-ready condition.

13. An indicator as in claim 1, wherein said circuit means includes a current-limiting resistor for limiting the current from said source means through said meter means.

14. An indicator as in claim 1, wherein the effect of said circuit means upon said meter means is to reduce the reading below the given range.

15. An indicator as in claim 14, wherein said given range includes an underrange and an overrange and wherein said circuit means causes said meter means to read below said underrange when said connection means is connected to a flash unit.

16. An indicator as in claim 15, wherein said photosensitive means includes a photoconductor.

17. An indicator as in claim 15, wherein said photosensitive means a photovoltaic cell and a bypass resistor having a predetermined resistance value connected to said photovoltaic cell so as to establish a predetermined electric current flow when said meter means reads in the underrange, and a cutoff switch in said photosensitive means.

18. An indicator as in claim 2, wherein insertion of the flashbulb into said connection means constitutes a switch for indicating a flash-ready condition.

19. An indicator as in claim 1, wherein the range includes an underrange and an overrange, and wherein said circuit means, when said connection means is connected to a flash unit, constrains said meter means to read higher than overrange.

20. An indicator as in claim 19, wherein said photosensitive means includes a photoconductor.

21. An indicator as in claim 1, wherein said given range includes an overrange and an underrange, said underrange indicates low lighting conditions, said circuits means constraining said meter means when said connection means is connected to a flash unit to read higher than said overrange.

22. An apparatus as in claim 1, wherein said switch means includes a capacitor connected to said source means and a switch connecting said capacitor to said connection means.

23. An indicator for flash photography comprising an exposure-measuring circuit having an ammeter and an photosensitive power source, a flash-ready signalling means having a flash-ready condition and a non-flash-ready condition, the flash-ready condition existing outside of a non-flash-ready range composed of an EE operation range, an overrange, and an underrange of the meter, said meter having a pointer for pointing into said ranges, said flash-ready signalling means bringing said pointer into said flash-ready range to indicate that preparation for flashlight photography is completed only when said flash-ready signalling means is brought into said flash-ready condition, said flash-ready signalling means bringing said pointer into said non-flash-ready range for indication of said non-flash-ready condition, operating means for a flash-auto mechanism for indicating flash-ready when set on flash, and a flash circuit for completing the preparation of flash photography in response to the flash-auto mechanism.

24. A camera comprising an objective, iris means, shutter means, shutter release means, photosensitive means responsive to the light on an object to the photographed by the camera, meter means coupled to said photosensitive means for indicating over a given range the light to which said photosensitive means is subject, source means, connection means for receiving a flashbulb, switch means connecting said connection means to said source for operating said flashbulb when said flashbulb is set in said connection means, and circuit means for coupling said connection means and said source means to said meter means for establishing a reading outside the given range when said connection means is connected to the bulb.

25. A camera as in claim 24, further comprising a shutter speed detecting member, said meter means including a stop member for stopping said detecting member at a predetermined location.

* * * * *